United States Patent
Gräf

(10) Patent No.: US 7,288,894 B2
(45) Date of Patent: Oct. 30, 2007

(54) ELECTRIC LAMP

(75) Inventor: Jürgen Gräf, Augsburg (DE)

(73) Assignee: Patent-Treuhand-Gesellschaft für elektrische Glühlampen mbH, Munich (DE)

( * ) Notice: Subject to any disclaimer, the term of this patent is extended or adjusted under 35 U.S.C. 154(b) by 310 days.

(21) Appl. No.: 11/216,017

(22) Filed: Sep. 1, 2005

(65) Prior Publication Data

US 2006/0061282 A1  Mar. 23, 2006

(30) Foreign Application Priority Data

Sep. 20, 2004  (DE) ................. 20 2004 014 645 U

(51) Int. Cl.
*H01J 17/18*  (2006.01)
(52) U.S. Cl. ........................ 313/623; 313/25
(58) Field of Classification Search ............ 313/25, 313/623–626
See application file for complete search history.

(56) References Cited

U.S. PATENT DOCUMENTS 3,109,952 A   11/1963   Beese
3,867,660 A   2/1975    Fohl

FOREIGN PATENT DOCUMENTS

| DE | 8601283 U    | 8/1986  |
|----|--------------|---------|
| EP | 0 571 813 A1 | 11/1993 |
| JP | 60107251     | 6/1985  |
| JP | 61165944     | 7/1986  |

*Primary Examiner*—Vip Patel
(74) *Attorney, Agent, or Firm*—William E. Meyer

(57) ABSTRACT

An electric lamp has a discharge vessel which is sealed in a vacuum-tight manner and is made from glass, the discharge vessel being surrounded in particular by an envelope part, the discharge vessel being essentially cylindrical, and defining a longitudinal axis L, and containing two electrodes at a predetermined distance from one another as well as a filling, an electrically insulated insert part also being fitted in the discharge vessel over a central part of the axial length. The electrically insulated insert part extends at least over the distance between the electrodes EA, it is fitted in the discharge vessel without the use of a retaining device, and it surrounds the electrodes in essentially tubular fashion such that it is spaced apart from them.

16 Claims, 6 Drawing Sheets

ELECTRIC LAMP

TECHNICAL FIELD

The invention relates to an electric lamp having a bulb which is sealed in a vacuum-tight manner and is made from glass, in particular quartz glass, the bulb being elongate, in particular being essentially cylindrical, and defining a longitudinal axis L, and containing a luminous means as well as a filling, an electrically insulated insert part also being fitted in the bulb over a central part of the axial length of the luminous means. Of particular concern here are metal halide lamps or else halogen incandescent lamps, for example. In this case, an elongate discharge vessel which is in particular sealed at two ends is often used as the lamp bulb.

BACKGROUND ART

U.S. Pat. No. 5,466,988 has already disclosed an electric lamp which has a spherical discharge vessel made from quartz glass. An insert part made from ceramic, for example a tube, is arranged axially in the interior of the discharge vessel and is intended to suppress convection. It has a retaining device which is formed, for example, from rings at the ends of the tube, the rings being supported in a resilient manner on the outer wall.

This arrangement is very complex and susceptible to errors, since separate retaining parts first need to be mounted on the insert part, and this unit needs to be introduced carefully into the discharge vessel. The circular discharge vessel means that axial fixing is considered to be necessary and that this is implemented by means of separate knobs on the inner wall. This design is therefore extremely expensive.

DISCLOSURE OF THE INVENTION

It is the object of the present invention to provide an electric lamp having a bulb which is sealed in a vacuum-tight manner and is made from glass, in particular quartz glass, the bulb being elongate, in particular being essentially cylindrical, and defining a longitudinal axis L, and containing a luminous means as well as a filling, an electrically insulated insert part also being fitted in the bulb over a central part of the axial length of the luminous means, which lamp can be mounted in a simple manner and can be produced in a manner which can be easily automated and is very cost-effective.

A further object of the invention is to provide a lamp bulb, in particular a discharge vessel, which has a temperature distribution which is as isothermal as possible. A further object is for as low a thermal load as possible to be applied to the wall of the lamp bulb during operation. In other words, a reduction in the hotspot temperature is desired in particular for discharge lamps.

This object is achieved by the following features: the electrically insulated insert part extends at least over 80% of the length of the luminous means and is fitted in the bulb without the use of a retaining device, and in that it surrounds the luminous means in essentially tubular fashion such that it is spaced apart from it.

Particularly advantageous refinements are described in the dependent claims.

The electric lamp according to the invention, in particular a high-pressure discharge lamp, has a lamp vessel, in particular a discharge vessel which is sealed in a vacuum-tight manner and is made from glass, in particular quartz glass, Vycor or another high-melting hard glass, said vessel being surrounded in particular by an envelope part, the lamp bulb being elongate, in particular being essentially cylindrical, and defining a longitudinal axis L, and containing a luminous means, in particular two electrodes at a predetermined distance from one another, as well as a filling, an electrically insulated insert part also being fitted in the bulb over a central part of the axial length in self-retaining fashion. The electrically insulated insert part extends at least over 80% of the length of the luminous means, in particular the distance between the electrodes or the length of the luminous element. The insert part is fitted in the bulb without the use of a retaining device, and it surrounds the luminous means, for example the electrodes, such that it is spaced apart from it. It is often essentially tubular.

This arrangement provides a completely different way of attaining isothermy. Until now, attempts have been made to increase the coldspot temperature in order to attain isothermy, i.e. following precisely the opposite route. This was achieved by coating the ends of the discharge vessel with reflective material. Two domes are usually at the ends of the discharge vessel. An alternative to this until now was to restrict the permissible power consumption in order to limit the hotspot temperature.

Using the design according to the invention, it is possible to achieve a similarly homogeneous temperature distribution to that achieved to date in the case of lamps having reflector domes at the ends at a higher power than was previously possible. The essence of the new arrangement is to insert the insert part into the bulb, which improves homogeneity without reflector domes being required for the purpose.

The insert part is preferably produced from a ceramic since this material is particularly temperature resistant and chemically inert. The insert part is advantageously a foil since this material is flexible. A ceramic foil is particularly preferred.

In order to implement an insert part without a retaining means, in particular two possibilities have proved to be potentially successful.

In one first embodiment, the insert part is arranged in the discharge vessel in a self-retaining manner, in particular by it having a spring action. This requirement is met best by an elastic foil. In this case, the simplest and most reliable use of the spring action is implemented by the spring action being brought about by a spring force which acts against the inner wall of the discharge vessel. Specific implementations are, in particular, the fact that the insert part in the form of a foil bears against the inner wall of the discharge vessel in the form of a C. Alternatively, the insert part may be a foil which is helically wound and bears against the inner wall of the discharge vessel. Such foils have sufficient robustness coupled with flexibility, in particular when they are approximately 200 to 1500 µm thick. In the case of helically wound foils, they tend to be thinner, i.e. typically 200 to 800 µm thick, and in the case of rather more C-shaped foils, they tend to be thicker, typically 700 to 1500 µm.

In a second embodiment, it is possible to dispense with a retaining means owing to a fundamental change in paradigm by the insert part being arranged loosely in the discharge vessel and being, in particular, a tube. Until now, efforts have always been made to avoid loose parts in the discharge vessel since they present the risk of damage but also because this could disconcert the customer. The risk of damage can be minimized, however, by certain geometric conditions being maintained, in particular as far as the dimensions of the tubular insert part in relation to the discharge vessel are concerned. An ability to move which is sufficiently restricted is achieved by the tube having an outer diameter which is approximately 80 to 95% of the inner diameter of the discharge vessel. As a result, it is firstly sufficiently removed from the hot electrodes and secondly the insert part does not rattle to such an extent that this could disturb the customer. This is also attributed to the specific material of the insert part, in particular ceramic. A metal part would make markedly louder noises. An additional advantageous measure is the coating or frosting of the outer bulb such that the customer can barely see a moving part which could irritate him.

The target of improved isothermy is achieved in particular when the insert part has a length of at least 80%, preferably at least 120%, in particular up to at most 140%, of the luminous means, in this case understood to be the length of the distance between the electrodes EA or length of the luminous element.

In particular when a loose insert part is used, but also when a resilient foil is used, it is advantageous if the discharge vessel has a central section which is cylindrical, tapering transition zones, which lead to the ends, becoming attached to the two ends of the central section. These ends are generally sealed with pinch seals, but fused seals are also possible. The invention does not relate to the type of seal.

In particular when a loose insert part is used, but also when a resilient foil is used, it is advantageous if the insert part has a length which differs from the length of the central section by at most 10%, preferably at most 5%. As a result, a certain natural fixing is achieved in the axial dimension, and this fixing approximately corresponds to the ability to move in the radial direction. Overall, the two degrees of freedom are then restricted to the same extent.

Specifically, the insert part may be made from a ceramic which withstands high temperatures, in particular $Al_2O_3$, oxides of yttrium, magnesium, zirconium or from a material which contains these oxides as essential components. This is also true for the foil.

In contrast to the prior art, it is thus possible to simplify the production sufficiently by the insert part being integral.

Thermal loading of the insert part is restricted sufficiently when the insert part, or its part closest to the axis, has a distance from the longitudinal axis which is at least 80% of the inner radius R of the central section of the discharge vessel, in particular at least 90% of R.

A typical application is a metal halide lamp which contains a filling with or without a mercury component, possibly with an inert starting gas, advantageously a noble gas. However, an application in mercury lamps is also possible.

BRIEF DESCRIPTION OF THE DRAWINGS

The invention will be explained in more detail below with reference to a plurality of exemplary embodiments. In the drawing.

BEST MODE FOR CARRYING OUT THE INVENTION

Figure 1:
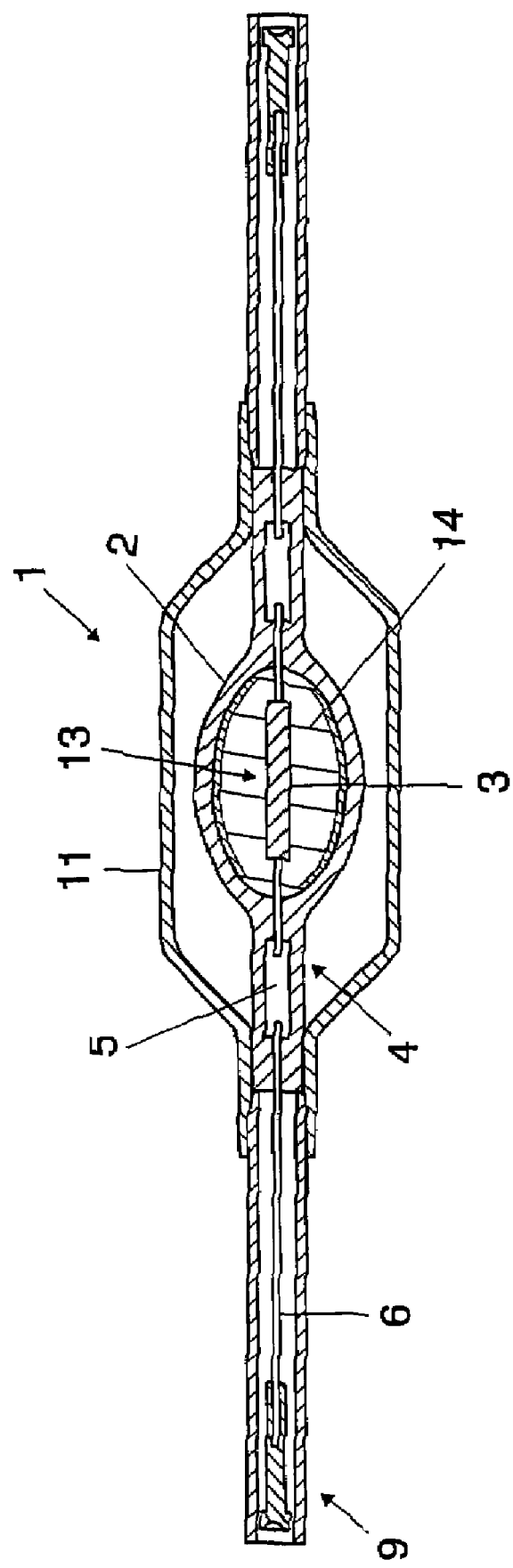
FIG. 1 shows a halogen incandescent lamp in section.

FIG. 1 shows an exemplary embodiment of a halogen incandescent lamp 1. In this case, the bulb which is in the form of a barrel body 2 and is made from quartz glass encloses a luminous element 3 as well as a halogen filling, as is known per se. The bulb ends are sealed by pinch seals 4 in which foils 5 are embedded. The outer power supply line 6 is passed to a base part 9. The bulbous part of the discharge vessel is surrounded by an outer bulb 11. An insert part 13 is implemented in this case by a thin foil 14, which is typically 500 µm thick, extending helically in the central region of the discharge vessel over the length of the luminous element 3.

Figure 2:
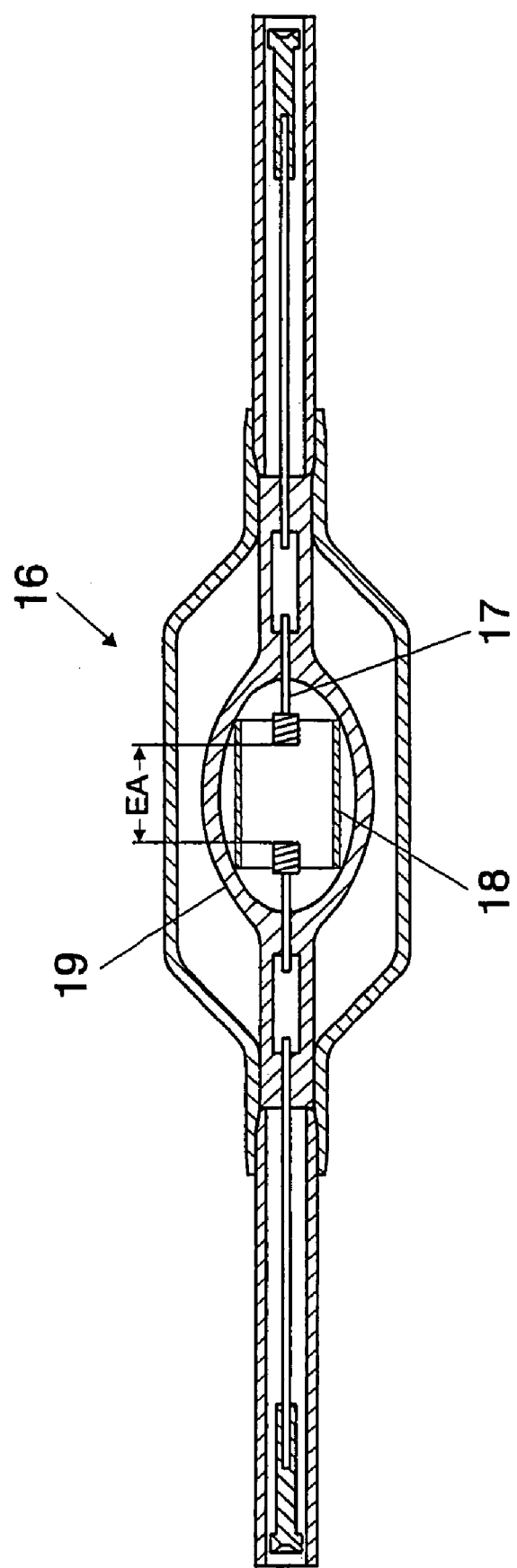
FIG. 2 shows an exemplary embodiment of a metal halide lamp.

A further variant (FIG. 2) is a metal halide lamp 16 having two electrodes 17, in the case of which the insert part is a cylindrical ceramic tube 18, advantageously made from $Al_2O_3$, the length of the tube being dimensioned such that it bears against the discharge vessel 19 in the form of a barrel body with only a small amount of play. The overall length of the tube is in this case approximately 120% of the length of the distance between the electrodes EA.

Figure 3:
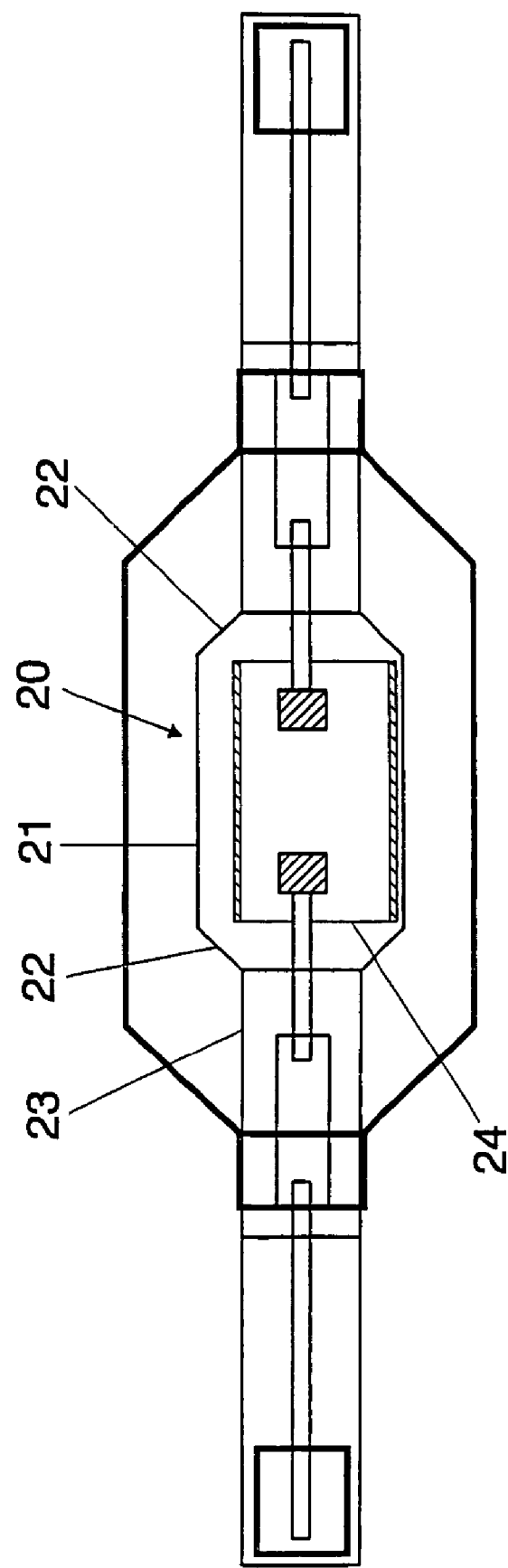
FIG. 3 shows a further exemplary embodiment of a metal halide lamp.

FIG. 3 shows a lamp in which the discharge vessel 20 has a cylindrical, central section 21 adjoined by two tapering sections 22. Said tapering sections 22 lead to the ends 23 in the form of pinch seals. Here too, the insert part is a cylindrical tube 24 which has a length of 140% of the distance between the electrodes. Its length is slightly shorter, namely 5% shorter, than the length of the central section 21. Its inner diameter is 85% of the inner diameter of the central section, and its outer diameter is 92% of the inner diameter of the central section 21. It rests loosely in the discharge vessel 21 since it cannot cause any damage therein owing to its low weight given a thickness of 200 to 300 µm.

Figure 4:
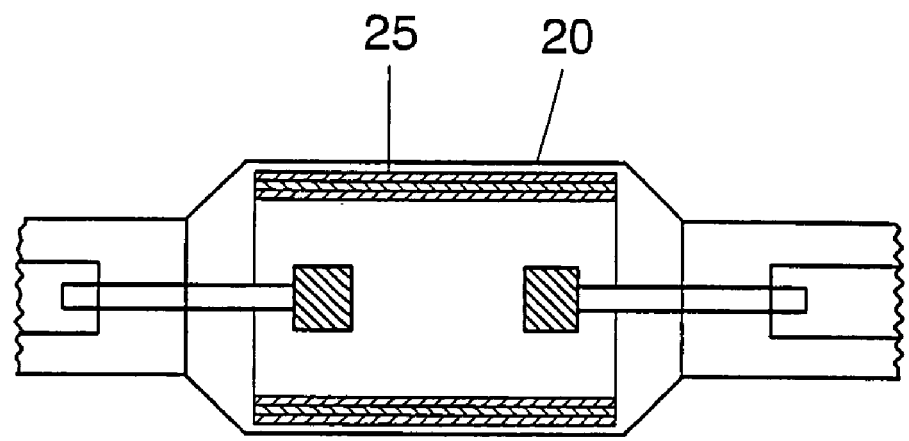
FIG. 4 shows a further exemplary embodiment of a metal halide lamp.

In FIG. 4, the discharge vessel 20 of a 150 W metal halide lamp has a similar design to that in FIG. 3. The insert part, however, is wound as an elastic helical tube 25 comprising three layers of a ceramic foil, the thickness of the foil being approximately 300 µm. Such foils are very cost-effective. The surface of the foil has a temperature of approximately 1100° C., which is easily above that of the ceramic material. On the other hand, the shielded bulb wall is markedly cooler, namely by approximately 100° C. The life of such a lamp is thus extended considerably. The isothermy is considerably improved, and the difference between the coldspot and the hotspot is only 80° C. On the other hand, this difference without the insert part but with the reflector in the earlier embodiment was 140° C.

Figure 5:
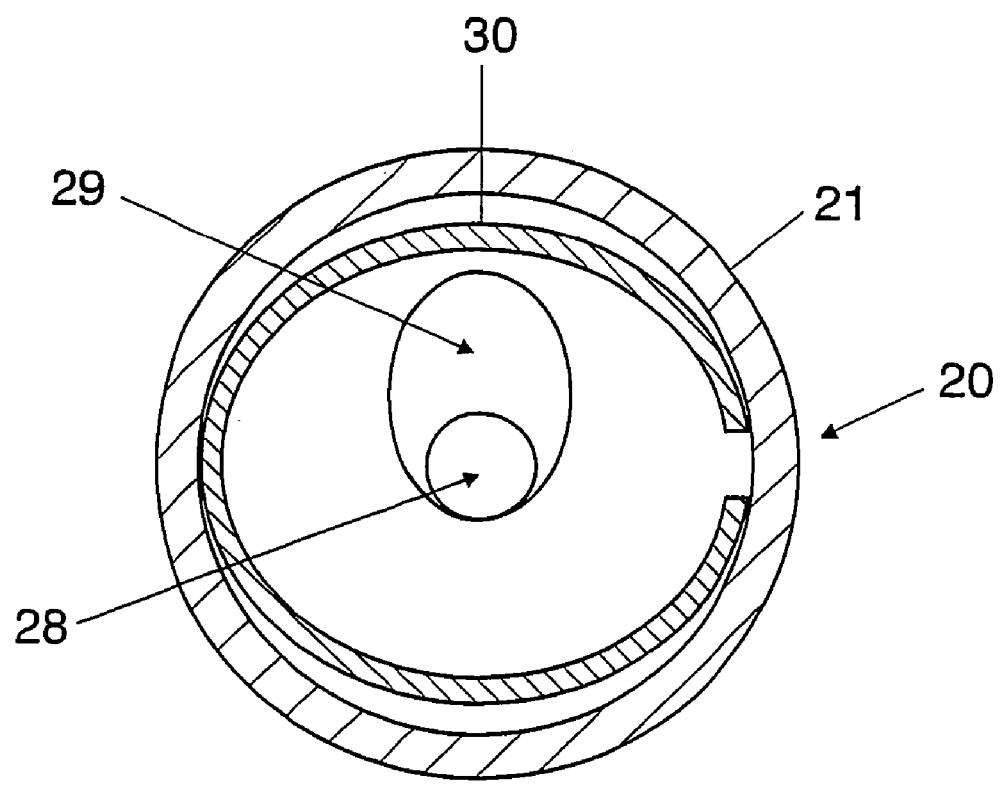
FIG. 5 shows a further exemplary embodiment of a discharge vessel.

FIG. 5 shows a further exemplary embodiment in which the discharge vessel 20 is designed as in FIG. 3 but is shown here in cross section. In this case, a large-area foil 30 is used which, in the installed state, shields approximately 95% of the inner surface of the central section 21. This foil is only made to fit in a clamping manner such that it is in principle in the form of a C, in section. Furthermore, the deflection of the discharge arc 29 with respect to the position of the electrode 28 is shown.

Figure 6:
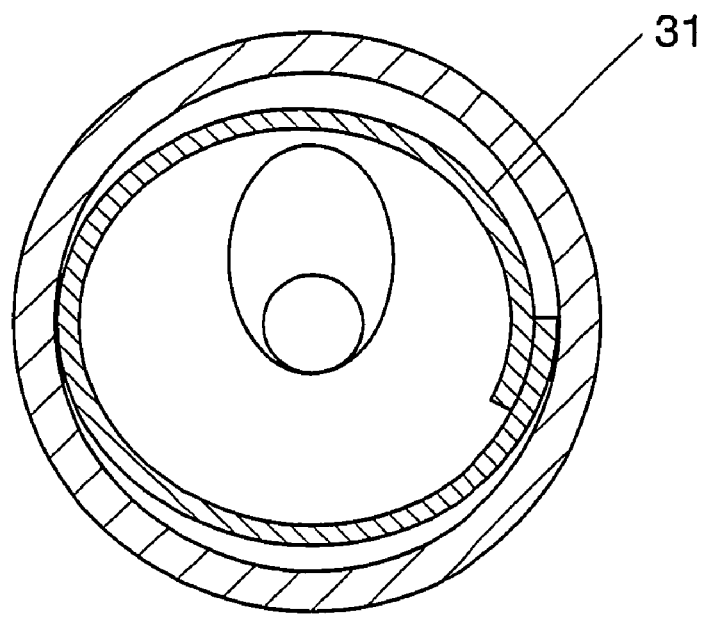
FIG. 6 shows a further exemplary embodiment of a discharge vessel.
Figure 7:
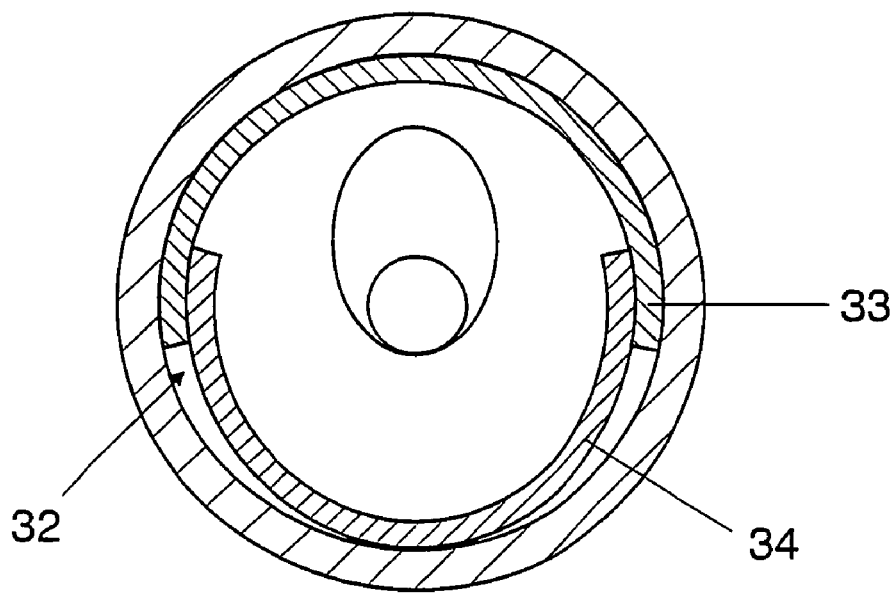
FIG. 7 shows a further exemplary embodiment of a discharge vessel.

Alternatively, the foil 31 may also be selected in terms of its width, however, such that it overlaps at its ends in the clamped-in state (FIG. 6); as an alternative the foil 32 may also be composed of two parts 33, 34 (FIG. 7) which each essentially cover a hemisphere and overlap at the ends. This design provides an extreme degree of freedom of shape such that different wattages or designs of the discharge vessel can be covered with a single foil type. The C shape as the basic design prevents stresses.

Figure 8:
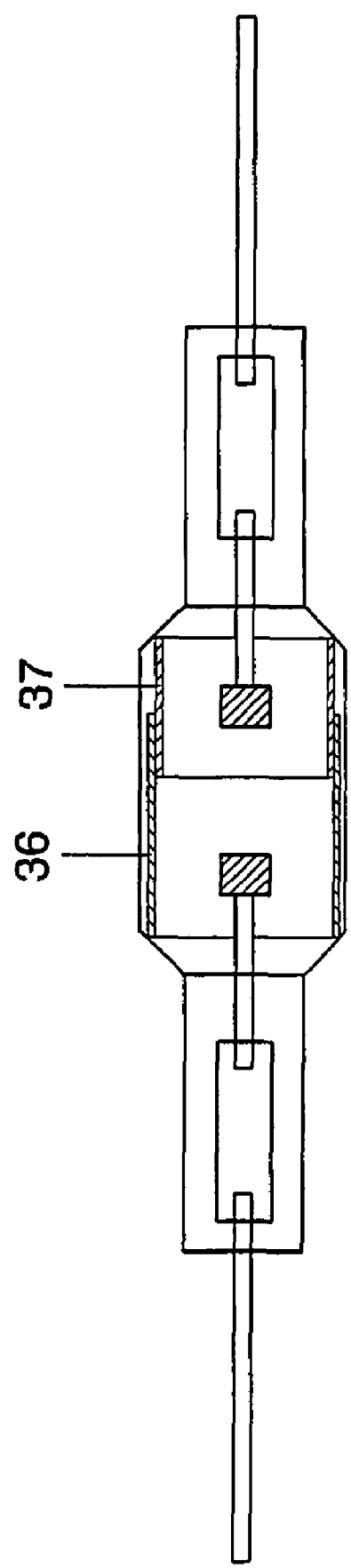
FIG. 8 shows a further exemplary embodiment of a discharge vessel.

As an alternative, two foils 36, 37 may also be used, whose overlapping takes place in the axial length (FIG. 8). In this case, the diameter of the two foils is slightly different. Two basic types of foils can therefore be used for bulbs of different lengths.

What is claimed is:

1. An electric lamp having a bulb which is sealed in a vacuum-tight manner and is made from glass, in particular quartz glass, the bulb being elongate, in particular being essentially cylindrical, and defining a longitudinal axis L, and containing a luminous means as well as a filling, an electrically insulated insert part also being fitted in the bulb over a central part of the axial length of the luminous means, wherein the electrically insulated insert part extends at least over 80% of the length of the luminous means and is fitted in the bulb without the use of a retaining device, and in that it surrounds the luminous means in essentially tubular fashion such that it is spaced apart from it.

2. The electric lamp as claimed in claim 1, wherein the insert part is produced from a ceramic.

3. The electric lamp as claimed in claim 1, wherein the insert part is a foil.

4. The electric lamp as claimed in claim 1, wherein the insert part is arranged in the bulb in a self-retaining manner, in particular by it having a spring action.

5. The electric lamp as claimed in claim 4, wherein the spring action is brought about by a spring force which acts against the inner wall of the bulb.

6. The electric lamp as claimed in claim 1, wherein the insert part is arranged loosely in the bulb and is, in particular, a tube.

7. The electric lamp as claimed in claim 6, wherein the tube has an outer diameter which is approximately 80 to 95% of the inner diameter of the bulb.

8. The electric lamp as claimed in claim 3, wherein the insert part in the form of a foil bears against the inner wall of the bulb in the form of a C.

9. The electric lamp as claimed in claim 3, wherein the insert part is a foil which is helically wound and bears against the inner wall of the bulb.

10. The electric lamp as claimed in claim 3, wherein the foil is approximately 200 to 1500 μm thick.

11. The electric lamp as claimed in claim 1, wherein the insert part has a length of at least 120% of the distance between the electrodes EA if the lamp is a discharge lamp.

12. The electric lamp as claimed in claim 1, wherein the bulb has a central section which is cylindrical with a constant diameter, tapering transition zones, which lead to the ends, being adjacent to the central section.

13. The electric lamp as claimed in claim 11, wherein the insert part has an axial length which is shorter than the axial length of the central section and differs from the length of the central section by at most 10%, preferably at most 5%.

14. The electric lamp as claimed in claim 1, wherein the insert part is made from a ceramic which withstands high temperatures, in particular $Al_2O_3$, oxides of yttrium, magnesium, zirconium or from a material which contains these oxides as essential components.

15. The electric lamp as claimed in claim 1, wherein the insert part is integral.

16. The electric lamp as claimed in claim 1, wherein the insert part has a minimum distance from the longitudinal axis which is at least 80% of the inner radius R of the central section, in particular at least 90% of R.

* * * * *